United States Patent [19]

O'Farrell et al.

[11] 4,303,766

[45] * Dec. 1, 1981

[54] PROCESS FOR SULFONATING POLYMERS

[75] Inventors: Charles P. O'Farrell, Clark; Edward N. Kresge, Watchung, both of N.J.

[73] Assignee: Exxon Research & Engineering Co., Florham Park, N.J.

[*] Notice: The portion of the term of this patent subsequent to Aug. 8, 1995, has been disclaimed.

[21] Appl. No.: 859,288

[22] Filed: Dec. 12, 1977

Related U.S. Application Data

[60] Division of Ser. No. 764,515, Jan. 31, 1977, Pat. No. 4,105,647, which is a continuation of Ser. No. 445,890, Feb. 26, 1974, abandoned, which is a continuation of Ser. No. 208,384, Dec. 15, 1971, abandoned.

[51] Int. Cl.³ .................. C08C 19/20; C08C 19/22
[52] U.S. Cl. .................. 525/353; 525/333; 525/334; 528/486
[58] Field of Search .................. 525/353, 344

[56] References Cited

U.S. PATENT DOCUMENTS

| | | | |
|---|---|---|---|
| 2,446,536 | 8/1948 | Hardy | 260/79.3 R |
| 2,910,461 | 10/1959 | Nowlin | 526/352 X |
| 3,033,834 | 5/1962 | Roth | 260/79.3 R |
| 3,072,618 | 1/1963 | Turbak | 260/79.3 R |
| 3,205,285 | 9/1965 | Turbak | 260/79.3 R |
| 3,269,997 | 8/1966 | Lyons | 526/352 X |
| 3,306,871 | 2/1967 | Miller | 260/29.7 |
| 3,396,136 | 8/1968 | Dickerson | 260/30.6 |
| 3,642,728 | 2/1972 | Canter | 260/79.3 R |

OTHER PUBLICATIONS

Gilbert, E. E., Sulfonation and Related Reactions, Interscience Publishers (N.Y.), pp. 22, 23, 33 (1965).

*Primary Examiner*—C. A. Henderson
*Attorney, Agent, or Firm*—Richard E. Nanfeldt

[57] ABSTRACT

A process for sulfonating polymers which are prepared by solution polymerization using a Friedel-Crafts or Ziegler-type catalyst is disclosed. The reactor effluent containing polymer, unreacted light monomers, diluent-solvent and active catalyst is first treated to remove substantially all unreacted light monomer, e.g. by flashing. The effluent is then treated with a sulfonating agent (e.g. acetyl sulfate and acetic acid) which simultaneously deactivates catalyst. Thereafter, the sulfonated polymer is neutralized, e.g. by exposure to metal salts, organic amines, etc., and subjected to normal finishing operations, e.g. deashing, steam stripping, stabilizing and drying.

5 Claims, No Drawings

PROCESS FOR SULFONATING POLYMERS

This application is a Divisional application of Ser. No. 764,515 now U.S. Pat. No. 4,105,647 filed Jan. 31, 1977 which in turn is a Continuation of Ser. No. 445,890 filed Feb. 26, 1974 now abandoned which in turn is a Continuation of Ser. No. 208,384 filed Dec. 15, 1971 now abandoned.

BACKGROUND OF THE INVENTION

Uncured elastomers such as natural rubber, butyl rubber, EPDMs, polybutadiene, etc., may be crosslinked or vulcanized by the use of sulfonic accelerators which react with the carbon of the unsaturated bonds in the polymer molecules to form in effect a thermoset product which can no longer be fabricated or worked except by machining or similar techniques. These vulcanized polymers have found wide utility because of the significant improvement in physical properties by crosslinking. Thus, by vulcanizing rubber, elasticity, impact resistance, flexibility, and many other properties are either introduced or improved.

Recently, a class of polymers has been developed which, although they are crosslinked, have a softening point or softening range of temperatures and may even be dissolved in various solvents. At normal use temperatures these polymers behave similarly to crosslinked polymers. At elevated temperatures, however, they are readily deformed and worked in the same manner as thermoplastic resins. Such polymers are said to be physically crosslinked. An example of such materials are ionic hydrocarbon polymers (ionomers). These products owe their unique properties to the fact that crosslinking is accomplished by ionic rather than covalent bonding between molecules of the polymer. Typical of these ionomers are sulfonated polymers wherein the sulfonate is present in side chains in the form of sulfonic acid groups, sulfonic esters, or the corresponding metal salts of the sulfonic acid groups.

Methods of sulfonating polymers are well-known in the art. For example, aromatic containing polymers are sulfonated by the method described in U.S. Pat. No. 3,072,618, wherein a complex of a lower alkyl phosphate and $SO_3$ is used as the sulfonating agent. These sulfonated aromatic polymers have generally been sulfonated to sufficient extent to be water-soluble in the form of their alkali metal salts. Other sulfonated polymers have been prepared by copolymerizing a styrene sulfonic acid salt with other monomers to form plastic polymers containing ionic crosslinks (see, e.g., U.S. Pat. No. 3,322,734). Natural rubber has been sulfonated by complexing chlorosulfonic acid with ethers or esters and reacting the complex with the rubber in solution (see, e.g., German Patents Nos. 582,565; 550,243 and 572,980). Polyolefins such as polypropylene, polyethylene, etc., have similarly been sulfonated utilizing complexes of lower alkyl phosphorus compounds and $SO_3$; see, e.g., U.S. Pat. No. 3,205,285, which teaches that the dyeability of polypropylene and similar polymers may be improved by reacting the polymer fiber with the $SO_3$ complex. The reaction of such treated fibers with alkali salts improves their dyeability. Further, it has recently been discovered that both plastic and elastomeric aromatic containing polymers (e.g., styrene-butadiene rubber) and non-aromatic polymers, in particular, olefinically unsaturated polymers such as butyl rubber and ethylene-propylene-diene terpolymers (commonly known as EPDMs) may be sulfonated to make physically cross-linked materials (see U.S. Application Ser. Nos. 806,052 and 877,849, incorporated herein by reference).

In general, the polymers mentioned above which are capable of sulfonation and are therefore useful in the instant invention are produced by solution polymerization, i.e., the monomeric reactants are dissolved in a suitable solvent and subjected to polymerization in the presence of either a Friedel-Crafts or a Ziegler-type catalyst. Ziegler-type catalysts are well-known in the art and typically include a compound which is preferably a halide of a transition metal, (e.g., titanium tetrachloride or vanadium tetrachloride) together with, as cocatalyst, an organometal compound (e.g., an organoaluminum compound such as diethyl aluminum chloride). Generally, the molar ratio of the cocatalyst to the catalyst is in the range of 1:1 to 16:1, preferably 1.5:1 to 7:1. The total amount of catalyst composition employed in the polymerization reaction may vary depending upon the particular components of the catalyst system but is generally in the range of about 0.01 to about 0.1 parts, preferably about 0.05 parts per hundred parts by weight of solvent.

Friedel-Crafts catalysts are also well-known in the art. For a good discussion of these types of catalysts, see the Kirk-Othmer Encyclopedia of Chemical Technology, 2nd Edition, Interscience Publishers 1966, Vol. 10, pp. 158–163. In general, this type of catalyst may be classified as a Lewis acid and may be divided into six basic groups on the basis of chemical constitution: (1) acidic halides; (2) metal alkyls and alkoxides; (3) proton acids; (4) acidic oxides and sulfides, modified zeolites; (5) cation-exchange resins, and (6) metathetic cation-forming agents. The most commonly used of these types are the acidic halides. Typical examples of acidic halides include $AlCl_3$, $AlBr_3$, $BeCl_2$, $CdCl_2$, $ZnCl_2$, $BF_3$, $BCl_3$, $BBr_3$, $TiCl_4$, $FeCl_3$, etc. When these types of catalysts are employed, the amounts used may, of course, vary depending upon the polymer to be produced but are generally in the range of about 0.01 to about 10.0 parts, preferably about 0.05 to about 0.5 parts, typically 0.2 parts per hundred parts by weight of solvent.

The solvent employed in the solution polymerization must be a nonreactive reaction medium. Typically, a saturated aliphatic hydrocarbon such as heptane, pentane, and hexane, or a chlorohydrocarbon such as tetrachloroethylene, methylchloride, ethylchloride, etc is employed. For purposes of this invention, an aromatic hydrocarbon such as toluene, is preferably not employed since aromatic rings may be subjected to sulfonation reactions at higher temperatures. All steps in the polymerization reaction are preferably carried out in the absence of extraneous amounts of oxygen, moisture, carbon dioxide or other harmful materials. Preferably, all reactants and catalysts should be pure and dry and blanketed with inert gas such as nitrogen or methane.

Reaction temperatures and pressures will, of course, vary to some extent depending on the polymer being prepared, and in any event these reaction conditions are not critical to functioning of the instant invention. At the conclusion of the polymerization reaction, the reactor effluent, as withdrawn, will normally include the following components: (a) the product polymer which is typically dissolved in the inert organic solvent to form a solution containing about 1 to about 50 parts, typically 3 to 10 parts of polymer per hundred parts of solvent; (b) unreacted monomer(s); and (c) some active and some spent catalyst.

In practice, the reactor effluent is normally treated by catalyst deactivation by addition of water, an alcohol or similar material; deashing; steam stripping; stabilizing; and drying.

Numerous problems may be encountered in attempting to sulfonate polymers prepared by solution polymerization. If the recovered polymer is to be stored prior to sulfonation, one difficulty arises in redissolving the baled stock prior to post-polymerization modification. Another difficulty resides in the fact that the stabilizers and processing aids which must be added in the normal finishing operation tend to react with the sulfonating agents resulting in greatly decreased efficiency of reaction and in unwanted side products. If it is decided to sulfonate freshly polymerized cement, difficulties arise from the fact that the polymer cement after polymerization contains substantial quantities of unreacted monomers and active catalyst. Unless the catalyst is deactivated, unwanted additional polymerization is likely to occur. However, if water or alcohols, agents used commercially as deactivating agents, are employed, the polymer cement is difficult or impossible to sulfonate since the catalyst deactivating agents will also deactivate the sulfonating reagent.

THE PRESENT INVENTION

It has now been unexpectedly discovered that it is possible to simultaneously sulfonate freshly prepared polymer cement and at the same time deactivate any catalyst present in that cement by the use of certain specific sulfonating agents, i.e. to sulfonate polymer and deactivate catalyst is a single operation.

While any of the polymers mentioned previously as being capable of sulfonation are applicable in the instant invention, butyl rubber and EPDM's are particularly preferred herein.

The sulfonating agents may be broadly classified into two general types. The first comprises a sulfur trioxide donor in combination with a Lewis base containing oxygen, nitrogen, or phosphorus. The Lewis base serves as a complexing agent for the sulfur trioxide donor and preferably will be a Lewis base containing phosphorus.

The term "sulfur trioxide donor" as used herein means a compound containing available sulfur trioxide. Illustrative of such sulfur trioxide donors are $SO_3$, chlorosulfonic acid, fluorosulfonic acid, sulfuric acid, oleum, etc.

As is well-known, a Lewis base is an electron donor. Phosphorus containing Lewis bases useful as complexing agents in the instant invention may be either inorganic or organic. It is preferred, however, that the phosphorus compound be an organic compound having the general formula:

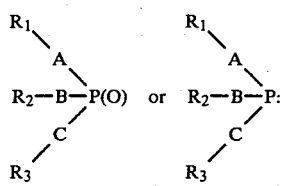

wherein A, B and C are independently selected from the group consisting of oxygen and —$CH_2$— and $R_1$, $R_2$ and $R_3$ are independently selected from the group consisting of $C_1$ to $C_{10}$ alkyl, aryl, alkaryl and aralkyl.

Illustrative non-limiting examples of organic phosphorus compounds falling within the scope of these general formulae include: triethyl phosphate, trimethyl phosphate, tripropyl phosphate, tributyl phosphate, triethyl phosphite, trimethyl phosphite, tripropyl phosphite, tributyl phosphite, diethyl hydrogen phosphate, dimethyl hydrogen phosphate, diethyl hydrogen phosphite, dimethyl hydrogen phosphite, ethyl dihydrogen phosphate, methyl dihydrogen phosphate, ethyl dihydrogen phosphite, methyl dihydrogen phosphite, tris(2,4-dichlorophenyl) phosphate, tris(2,4-dichlorophenyl) phosphite, bis(2,4-dichlorophenyl) hydrogen phosphate, bis(2,4-dichlorophenyl) hydrogen phosphite, tris(p-nitrophenyl) phosphate, tris(p-nitrophenyl) phosphite, bis(p-nitrophenyl) hydrogen phosphate, bis(p-nitrophenyl) hydrogen phosphite, tris(p-sulfophenyl) phosphate, tris(p-sulfophenyl) phosphite, 2,4-dichlorophenyl dihydrogen phosphate, 2,4-dichlorphenyl dihydrogen phoshite, ethyl metaphosphate, p-nitrophenyl metaphosphate, tris(beta-chloroethyl) phosphate, tris(2,4,6-trimethylphenyl) phosphate and tris(3,4,6-trimethyl-benzyl) phosphate.

Other organic phosphorus containing compounds suitable for use as complexing agents include various organic phosphinites, phosphonates, phosphonites, phosphines and pyrophosphates. The organic pyrophosphates have the general formula:

wherein $R_1$, $R_2$, $R_3$ and $R_4$ are independently selected from the group consisting of hydrogen, $C_1$ to $C_{12}$ alkyl, aryl, aralkyl, alkaryl and mixtures thereof with the proviso that at least two R groups are not hydrogen. The R groups may be halogen-substituted and, in the case of phenyl groups, may be either halogen or nitro-substituted. As used herein, the term "substituted derivatives thereof" when used in reference to these R groups means nitro- or halogen-substituted R groups.

Illustrative of such organic pyrophosphates are tetraethyl pyrophosphate, tetramethyl pyrophosphate, dimethyl diethyl pyrophosphate, bis(2,4-dichlorophenyl) diethyl pyrophosphate, sim-p-nitrophenyl pyrophosphate, tetra(beta-chloroethyl) pyrophosphate, diethyl dihydrogen pyrophosphate, and di(2,4-dichlorophenyl) dihydrogen pyrophosphate.

Illustrative of phosphorus containing inorganic complexing agents are phosphoric acid, phosphorus acid, pyrophosphoric acid, metaphosphoric acid, phosphonic acid and phosphinic acid. In addition to the acids, their mono-, di- and tri-substituted derivatives may also be employed.

In general, when using phosphorus containing complexing agents, the complex may contain about 1 to about 15, preferably about 1 to about 9 moles, more preferably about 1 to 5 moles, e.g., 3 to 4 moles, of sulfur trioxide donor per mole of complexing agent.

Other Lewis bases suitable as complexing agents are those which contain oxygen or nitrogen. The nitrogen containing Lewis base may be any primary, secondary or tertiary organic amine or cyclic organic amine having the following general formulae:

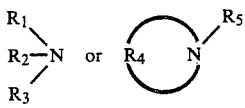

wherein $R_1$, $R_2$, $R_3$ and $R_5$ are independently selected from the group consisting of hydrogen, $C_1$ to $C_{36}$ alkyl, aryl, alkaryl, aralkyl or mixtures or substituted analogues thereof, provided that where $R_1$ and $R_2$ are hydrogen, $R_3$ may not be hydrogen, and $R_4$ is selected from the group consisting of $C_3$ to $C_{36}$ alkylene or substituted analogues. By "substituted analogues" is meant that where the $R_1$, $R_2$, $R_3$, $R_4$ or $R_5$ radicals contain more than two carbon atoms, they may be heterogeneous organic radicals containing oxygen, halogen, nitro groups or mixtures thereof. That is, $R_1$, $R_2$, $R_3$, $R_4$ and $R_5$ may be ethereal, contain substituted halogen atoms (i.e. chloride, bromide, iodide), nitro groups or comprise both ethereal and substituted groups.

Illustrative of these nitrogen containing Lewis bases are trimethylamine, triethylamine, dimethylaniline, diethylaniline, piperidine, morpholine, N-ethylmorpholine, diethylaminoacetal, and 2-chlorotriethylamine.

Other suitable complexing agents containing nitrogen may be represented by the formula:

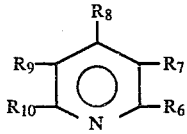

wherein $R_6$, $R_7$, $R_8$, $R_9$ and $R_{10}$ are hydrogen, halogen, or $C_1$ to $C_{36}$ alkyl, aryl, alkaryl or aralkyl or substituted analogues thereof. By "substituted analogues" is meant that the R groups may contain halogen, oxygen atoms, or nitro groups in the form described previously. In addition, fused cyclic ring and polymeric structures are satisfactory.

Illustrative of this type of compound are pyridine, 2-methyl pyridine, 2,6-dimethyl pyridine, quinoline, quinaldine, poly-2-vinyl pyridine, poly-4-vinyl pyridine, 2-phenyl pyridine, 2-benzyl pyridine, 2,6-diphenyl pyridine, 2,6-dibenzyl pyridine, 3-nitropyridine, 4-chloropyridine and 2-bromopyridine.

The preferred nitrogen containing complexing agents are triethyl amine and tri-n-propylamine. The molar ratio of sulfur trioxide donor to nitrogen in the complex may be as high as 5 to 1, but the preferred ratio is 1 to 1.

Oxygen containing Lewis bases have also been found useful for complexing sulfur trioxide donor. The general formulae of such bases are:

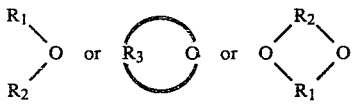

wherein $R_1$ and $R_2$ are independently selected from the group consisting of substituted or unsubstituted $C_2$–$C_{36}$ alkyl, aryl, alkaryl or aralkyl and $R_3$ is a substituted or unsubstituted $C_3$–$C_{36}$ alkylene. The term "substituted" as used herein means that for $R_1$, $R_2$ or $R_3$ greater than $C_2$, halogen, nitro groups and ethereal oxygen atoms may also be present. The $R_3$ radical may also contain $C_1$ to $C_{20}$ alkyl, aryl, alkaryl or aralkyl groups.

Illustrative of the oxygen containing Lewis bases falling within the scope of the above formulae are tetrahydrofuran, para-dioxane, 2,3-dichloro-1,4-dioxane, metadioxane, 2,4-dimethyl-1,3-dioxane, 2-phenyl-1,3-dioxane, diethyl ether, trioxane and bis(2-dichloroethyl)-ether. The preferred oxygen containing bases are p-dioxane, tetrahydrofuran and bis-(2-dichloroethyl) ether.

Other oxygen containing Lewis bases suitable as complexing agents are esters having the general formula:

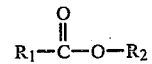

wherein $R_1$ and $R_2$ are $C_1$ to $C_{10}$ alkyl, phenyl or benzyl. Illustrative of such esters are benzyl acetate, butyl acetate, butyl propionate, methyl benzoate, hexyl acetate, isobutyl benzoate, ethyl-o-bromobenzoate, p-nitrophenyl acetate, ethyl-n-butyrate, ethyl stearate, and ethyl phenyl acetate.

The molar ratio of $SO_3$ donor to oxygen containing complexing agent may be as high as 15 to 1; preferably less than about 9:1, more preferably about 4:1 to about 1:1, e.g. 2:1.

Any of the phosphorus, oxygen or nitrogen containing Lewis bases may be used individually as complexing agents or mixtures thereof may be used. The preferred complexing agents are the organic phosphorus compounds, and most preferably are trimethyl phosphite, triethyl phosphite, and trialkyl phosphates, more preferably triethyl phosphate. The preferred sulfur trioxide donor is $SO_3$.

In all cases, whether employing an oxygen, nitrogen, or phosphorus containing Lewis base as complexing agent, where the complexing agent contains aromatic units, the use of excess sulfur trioxide donor is required to compensate or any sulfonation of these units.

Further, since the reactions of the above-mentioned complexes of $SO_3$ with unsaturation in the polymer chains to be sulfonated has been found to be nonquantitative, the use of excess complex is often desirable to give the required amount of sulfonation.

Generally, the molar ratio of the complex, containing one $SO_3$ moiety, per mole of unsaturation in the polymer is about 4:1 to about 0.1:1, preferably about 2:1 to about 0.1:1, more preferably 1.5:1 to 0.1:1, and typically about 1:1.

The second type of sulfonating agent may be described as an acyl sulfate in combination with a carboxylic acid. The term "acyl sulfate" as used in this invention is intended to mean a compound having the following formula:

wherein n is an integer from 1 to 3 and wherein R is an organic radical having a carbon number range from about 1 to about 30, preferably 1 to about 12, and being selected from the group consisting of straight and branched chain alkyls, cycloalkyls, alkylated cycloalkyls and cycloalkylated alkyls, ethers, thioethers, esters, thioesters, ketones and thioketones; which radicals may be substituted or unsubstituted provided that if substituted said substituents are nonreactive with the sulfate moiety. Typical nonlimiting examples of acyl sulfates which are useful in the practice of the instant invention include but are not limited to acetyl, isobutyryl, butyryl, heptanyl, chloroacetyl, malonyl, succinlyl, glutaryl, adipyl, etc. Acetyl sulfate is preferred.

The term "carboxylic acid" as used herein is meant to include compounds having the following formula:

wherein n is an integer from 1 to 3 and wherein the R group may be any organic radical as described above. Preferably, the R groups in the acyl sulfate and the carboxylic acid will be identical. The most preferable sulfonating agent of this type is acetyl sulfate in combination acetic acid.

Typical nonlimiting examples of methods of preparation of this type of sulfonating agent include the following general reaction schemes:

 (1)

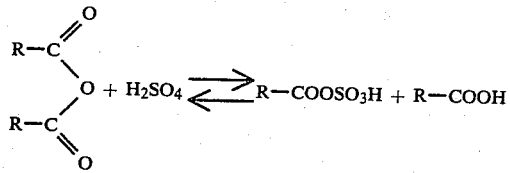 (2)

Because of solubility problems in subsequent reaction, i.e. sulfonation of polymer cement, when employing sulfuric acid in the second method, the first method of preparation is generally preferred. However, suitable non-reactive solvents i.e. chlorinated hydrocarbons, may be used to adjust the solubility of the sulfonating agent to the system. X in the first method indicates the number of moles of reactant per mole of $SO_3$ and should be at least about 1, preferably at least 2, and more preferably between 2 and 3. Where X is about 1, little or no carboxylic acid will initially be produced in the above reaction scheme. However, in such a situation the acyl sulfate formed as a product may function alone as a sulfonating agent for the polymer since, as the sulfonation reaction continues, sufficient carboxylic acid is generated to act as a catalyst quench. This may be seen by the following reaction scheme:

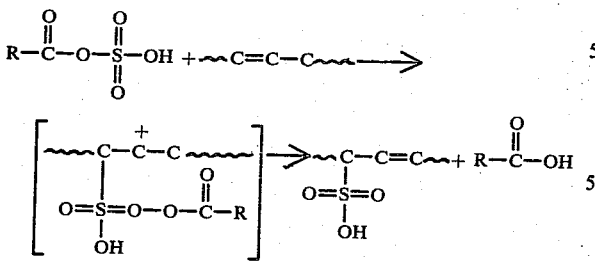

The second type of sulfonating agent (i.e., the acyl sulfate and carboxylic acid) may readily be prepared in a variety of solvents. For example, chlorinated hydrocarbon solvents, such as $CCl_4$, $CH_2Cl_2$, $ClCH_2CH_2Cl$, and $CHCl_3$, etc., may be employed. Other useful solvents include: alkanes, such as hexane, pentane, cyclohexane, etc. and ethers, i.e. dioxime, diethyl ether, etc. This solvents may be the same solvents which are used in the original polymerization reaction to prepare the polymer to be sulfonated. Therefore, it can be seen that these sulfonating agents may readily be prepared in situ in the polymer cement.

In general, the novel process of the instant invention for sulfonating polymers prepared by solution polymerization may be carried out in the following manner. After a polymerization reaction employing a Friedel-Crafts or Ziegler-type catalyst to prepare the polymer to be sulfonated has been completed, the effluent which contains polymer, unreacted monomers, diluent-solvent and active catalyst is removed from the polymerization reactor and treated in order to remove substantially all unreacted light monomer, e.g., by flashing at reduced pressure. It is generally advantageous to the process to carry out the polymerization reactions to high monomer conversion consistent with the synthesis of the desired polymer. This can be accomplished in many cases by proper selection of process variables. For example, in Ziegler type polymerizations, reaction at low temperature, 0° C. to 30° C., improves monomer conversion. Reactor staging with two or more reactors can also be employed to improve monomer conversion. In this case, additional feeds of catalysts and/or the more reactive monomer(s) in copolymerizations are introduced to one or more additional polymerization stages. This leads to improved monomer conversion.

After polymerization the effluent is then treated with one of the sulfonating agents disclosed previously which acts to simultaneously deactivate catalyst and sulfonate the polymer. For example, with the first general type of sulfonating agent, the sulfur trioxide donor would sulfonate the polymer while the Lewis base would quench the catalyst; with the second type of sulfonating agent the acyl sulfate would sulfonate the polymer while the carboxylic acid would quench the catalyst. After the simultaneous sulfonation and catalyst quench, the sulfonated polymer is neutralized, e.g., by exposure to metal salts, organic amines, etc., and then subjected to standard finishing operations, e.g., deashing, steam stripping, stabilizing and drying.

More specifically, the reactor effluent, immediately after being withdrawn from the polymerization reactor, is preferably subjected to a flashing operation in order to remove substantially all unreacted light monomer. This flashing takes place at a pressure below that prevailing in the reactor, preferably at a pressure at least 2 atm. below reactor pressure, e.g., typically below about 4 atm., and more preferably in the range of about 0.25 atm. to about 1.5 atm., and at sufficient temperature to recover all unreacted light monomer (e.g., unreacted ethylene and propylene when preparing EPDMs), light impurities (e.g. propane, butenes and pentenes in EPDM polymerizations) and a substantial portion of diluent-solvent. The bottoms of this flashing operation contain polymer cement (i.e. polymer dissolved in diluent-solvent) and active catalyst. The temperatures for the flashing operation are normally in the range of about 50° to about 100° C. (typically 75° C.).

The bottoms of this flashing operation are then treated with the sulfonating agents of the instant invention. As mentioned previously, these sulfonating agents may be prepared in situ (e.g., by addition of acetic acid and $SO_3$ directly to the polymer cement) or may be prepared in solution previously with the solution being added to the polymer cement. If this latter method is employed, the solvent for the sulfonating agent should preferably be the same solvent as that used in the polymerization reaction.

No matter which type of sulfonating agent is employed and no matter which method is used to introduce the sulfonating agent, the number of moles of sulfonating agent should be at least equivalent to the number of moles of reactive catalyst residue plus the moles of reactive impurities plus the moles of unsaturation in the polymer to be sulfonated to sulfonate all unsaturation sites in the polymer. The amount of sulfonating agent to be added should be in the range of about 20 to about 5 parts, preferably 15 to 5 parts, typically 10 parts of sulfonating agent per hundred parts by weight of polymer containing approximately 2 weight percent unsaturation. The combination sulfonation-quench reaction will normally reach completion in from about 2 to about 60 minutes, typically 30 minutes. Thereafter, the sulfonated polymer is neutralized. Various methods may be used to neutralize the sulfonic acid. For example, a metal compound may be solubilized and added to a solution of polymer with good mixing. This neutralization may be illustrated by the equation:

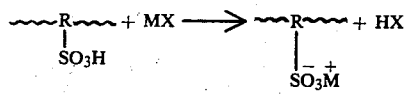

wherein R represents the polymer backbone, MX represents the metal compound wherein M is a metal such as sodium, lithium, potassium, calcium, magnesium copper, zinc, etc. and X is preferably selected from the group consisting of hydroxyl, alkoxy or the counter-ion of a weak acid such as carboxylic acid, carbonic acid, etc. Organic bases such as, amine compounds may also be used for neutralization.

The neutralization of the sulfonic acid groups results in ionic bonding within the polymer, i.e., the neutralized polymer is an ionomer. The amount of metal salt or organic amine to be added in order to effect complete neutralization may be readily calculated based on the degree of sulfonation of the polymer and the degree of neutralization desired.

After neutralization, the sulfonated polymer (ionomer) is subjected to normal finishing operation, e.g., steam stripping, deashing, stabilizing and drying. All of these procedures are equivalent to standard procedures well-known in the art for treating polymers prepared by solution polymerization and need not be gone into here.

The following examples are given by way of further illustration and not by way of limitation.

EXAMPLE 1

Ethylene-propylene-ethylidene norbornene terpolymer of number average molecular weight 65,000 was prepared using $VOCl_3/Ti(O-Bu)_4$ at a 1/1 wt. ratio and the ethylaluminum dichloride at an alumina/vanadium ratio of 7/1 as catalyst by solution polymerization in hexane so as to produce a 5.7 wt. % polymer cement in a continuous stirred tank reactor.

The following reaction conditions were used:

| | |
|---|---|
| Pressure | 50 psig |
| Temperature | 30° C. |
| Residence time | 13.5 minutes |
| Ethylene feed | 3.20 lb/100# n-hexane solvent |
| Propylene feed | 9.50 lb/100# n-hexane solvent |
| Ethylidene-norbornene feed | 0.21 lb/100# n-hexane solvent |
| $VOCl_3$ feed | 0.0055 lb/100# n-hexane solvent |
| Hydrogen feed | 9 ppm on n-hexane |

The following conversions of monomers were obtained.

| | |
|---|---|
| Ethylene conversion | 98 wt. % |
| Propylene conversion | 24 wt. % |
| Ethylidene-norbornene conv. | 78 wt. % |

The polymer cement was stripped of substantially all light monomer by heating the cement for ca. 3 hours @62° C. at 1 atmosphere under nitrogen purge. Thereafter, the cement 1800 g. (5.7 wt. % solids) was sulfonated using 4.95 ml of a solution prepared by adding 11.0 ml. of conc. $H_2SO_4$ (96%) to 23.4 ml of acetic anhydride. The sulfonated polymer was neutralized using ethyl amine 6.42 g (70% in $H_2O$) and stabilized with 0.75 g of phenyl-$\beta$ naphthylamine. The cement was steam stripped and the recovered polymer dried on a hot mill @300° F. for 10 minutes. As a control, polymer was recovered by the identical procedure except the sulfonation step was omitted.

After drying the polymer was analyzed for percent ash and percent sulfur. The Mooney viscosity was determined and the polymer was molded into pads. The physical properties of the uncured polymer compared to the starting feed together with the analytical results are presented in Table I.

TABLE I

| Polymer | Unsulfonated | Sulfonated |
|---|---|---|
| (1) wt. % Sulfur $(SO_3^-EA^+)$ | — | 0.66 |
| (2) wt. % Ash | 0.33 | 0.40 |
| (3) Moles double bond/100 g. polymer | $2.7 \times 10^{-2}$ | $2.7 \times 10^{-2}$ |
| Mooney Viscosity (260° F., 5 + 8 min. 0.2RPM) | 33 | 130 |
| (4) Physical Properties (uncured) (Molded 350° F., 30 min.) | | |
| Tensile Strength, psi | 300 | 1275 |
| % Elongation | 130 | 500 |

(1) Dietert Sulfur (ASTM-D-1552)
(2) By combustion
(3) By reaction with iodine monochloride
(4) ASTM-D-412-66

EXAMPLE 2

Ethylene-propylene-ethylidene norbornene terpolymer of a number of average molecular weight of 70,000 was prepared using $VOCl_3/Ti(O-Bu)_4$ and $ET_2AlCl$ as catalyst by solution polymerization in hexane so as to produce a 4.2 wt. % polymer cement substantially as in Example 1. The active catalyst was quenched using alcohol. The unreacted monomers were not removed by stripping. Thereafter, the cement, 2325 g (4.2 wt. % solids) was sulfonated using 4.73 ml of a solution prepared by adding 11.0 ml of concentrated $H_2SO_4$ (96%) to 23.4 ml of acetic anhydride. The reacted cement was then neutralized with 6.15 g (70% in $H_2O$) of ethylamine and stabilized with 0.75 g of phenyl-$\beta$-naphthylamine. The cement was steam stripped and the recovered polymer was dried on a lab mill @280° F. for 15 minutes.

As a control, polymer was recovered by the identical procedure except the sulfonation step was omitted.

After drying the polymer was analyzed for percent ash and percent sulfur. The Mooney viscosity was determined and the polymer was molded into pads. The physical properties of the uncured polymer compared to the starting feed together with the analytical result are presented in Table II.

TABLE II

| Polymer | Unsulfonated | Sulfonated |
|---|---|---|
| % Sulfur | — | 0.15 |
| % Ash | 0.35 | 0.39 |
| Mooney Viscosity (260° F. 5 + 8 min. 0.2 RPM) | 30 | 28 |
| Physical Properties (Uncured) (Molded 350° F. 30 min.) | | |
| Tensile Strength, psi | 450 | 600 |
| Elongation, % | 160 | 1550 |

This example shows that the process steps claimed herein, i.e. deep monomer stripping to remove unreacted monomers, and sulfonation byproducts used to quench catalyst, are essential to allow sulfonation of the polymer backbone.

While the above examples adequately illustrate the instant invention, it will be obvious that many modifications and variations of the invention may be made without departing from the spirit thereof. Therefore, the above examples are not intended in any way to limit the scope of the present invention, which is limited only by the claims which follow.

What is claimed is:

1. A process for sulfonating elastomeric polymers having olefinic unsaturation, said elastomeric polymers being prepared by solution process, said elastomeric polymers being selected from the group consisting of Butyl rubber, EPDM terpolymers, polybutadiene, and olefinically unsaturated elastomeric polymers which comprises:
    (a) dissolving monomer reactants in a solvent and polymerizing said reactants in the presence of a Friedel-Crafts or Ziegler type catalyst thereby forming a reactor effluent containing elastomeric polymer, unreacted light monomer, active catalyst, and solvent;
    (b) treating said reactor effluent to remove therefrom substantially all said unreacted light monomers;
    (c) simultaneously sulfonating the olefinic unsaturation of said elastomeric polymer and quenching said active catalyst by treating with an acyl sulfate sulfonating quenching agent, said acyl sulfate having the formula:

$R\text{-}(COOSO_3H)_n$ wherein n is an integer from 1 to 3 and wherein R is an organic radical having a carbon number range from about 1 to about 30 and being selected from the group consisting of straight and branched chain alkyls, cycloalkyls, alkylated cycloalkyls, and cycloalkylated alkyls, ethers, thioethers, esters, thioesters, ketones and thioketones; and
    (d) adding a neutralizing agent to neutralize the unneutralized sulfonate groups in said sulfonated elastomeric polymer, said neutralizing agent being selected from the group consisting of metal salts and organic amines.

2. The process according to claim 1, wherein said metal salt has the formula MX wherein M is selected from the group consisting of sodium, lithium, potassium, calcium, magnesium, copper or zinc and X is selected from the group of hydroxyl, alkoxy or the counterion of a weak acid.

3. The process according to claim 2, wherein said weak acid is a carboxylic acid.

4. The process according to claim 1 wherein said elastomeric polymer is an EPDM terpolymer.

5. The process according to claim 1 wherein said elastomeric polymer is a Butyl rubber.

* * * * *